US008988436B2

(12) United States Patent
Becker et al.

(10) Patent No.: US 8,988,436 B2
(45) Date of Patent: Mar. 24, 2015

(54) TRAINING SYSTEM AND METHODS FOR DYNAMICALLY INJECTING EXPRESSION INFORMATION INTO AN ANIMATED FACIAL MESH

(71) Applicant: Intific, Inc., Hampton, VA (US)

(72) Inventors: Michael J. Becker, Half Moon Bay, CA (US); Keith Copenhagen, Orinda, CA (US); Murray Taylor, Phoenix, MD (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/064,899

(22) Filed: Oct. 28, 2013

(65) Prior Publication Data

US 2014/0240324 A1    Aug. 28, 2014

Related U.S. Application Data

(63) Continuation of application No. 12/573,003, filed on Oct. 2, 2009, now Pat. No. 8,581,911.

(60) Provisional application No. 61/119,975, filed on Dec. 4, 2008.

(51) Int. Cl.
*G06T 13/20* (2011.01)
*G06T 13/80* (2011.01)
*G06T 13/40* (2011.01)

(52) U.S. Cl.
CPC ............... *G06T 13/80* (2013.01); *G06T 13/40* (2013.01)
USPC .......................................... 345/473; 345/419

(58) Field of Classification Search
None
See application file for complete search history.

(56) References Cited

U.S. PATENT DOCUMENTS

| 7,421,098 B2 * | 9/2008 | Bronstein et al. | 382/118 |
| 8,374,422 B2 * | 2/2013 | Roussel | 382/154 |
| 2008/0158230 A1 * | 7/2008 | Sharma et al. | 345/473 |

* cited by examiner

*Primary Examiner* — Said Broome
(74) *Attorney, Agent, or Firm* — Kilpatrick Townsend & Stockton LLP (57) ABSTRACT

A system and method for modifying facial animations to include expression and microexpression information is disclosed. Particularly, a system and method for applying actor-generated expression data to a facial animation, either in realtime or in storage is disclosed. Present embodiments may also be incorporated into a larger training program, designed to train users to recognize various expressions and microexpressions.

20 Claims, 10 Drawing Sheets

TRAINING SYSTEM AND METHODS FOR DYNAMICALLY INJECTING EXPRESSION INFORMATION INTO AN ANIMATED FACIAL MESH

CROSS-REFERENCE TO RELATED APPLICATIONS

This application is a continuation of U.S. patent application Ser. No. 12/573,003, filed Oct. 2, 2009, which claims priority from U.S. Provisional Patent Application No. 61/119,975, filed on Dec. 4, 2008, hereby incorporated by reference in their entireties.

STATEMENT REGARDING FEDERALLY SPONSORED R&D

The invention was made with Government support under Subcontract 199573 of Government Prime Contract N00173-03-C-2037, awarded by the Office of Naval Research. The Government has certain rights in the invention.

BACKGROUND

1. Field of the Invention

This application relates generally to computer animation and specifically to computer animated faces.

2. Description of the Related Art

Computer animations typically comprise a succession of frames. Each frame comprises a collection of "bones" and "vertices." "Bones" are data structures associated with groups of "vertices" such that as the bones move with each frame, so do the associated vertices. In this manner, the vertices of a mesh may be drawn and displaced on-screen based on bone movements, giving the impression of a dynamically moving mesh without having to individually dictate the motion of each vertex. The vertex mesh may be arranged in the shape of a face, as is the basis for computer character animation. For example, a "jaw bone" may be used to move vertices along the mouth to simulate speech.

Imbuing computer characters with the appearance of real human emotions has traditionally involved capturing the performance of an actor using a marker-based or similar system (also referred to as "motion-capture"). The 3D data derived from the marker capture is then mapped to a model mesh on a computer. Marker-based systems capture the actor's performance by placing small illuminated markers on the actor at points of interest. Precisely placed digital cameras are then used to record the markers' movements from different angles while the markers are illuminated during the performance. Motion capture systems thus capture the movement of a real object and translate that movement to a computer-generated representation. Such captures have been used in the motion-picture and the game industries to create source data used to lend authenticity to synthetic and otherwise noticeably artificial creations.

Live-actor motion-capture may be mapped to synthetic facial models, or to models derived from other actors through "retargeting" methods. Animation retargeting is a process by which animation data from one collection of bones (known as a skeleton) is applied to another collection of bones. That is, the captured points of interest of a real-world performance will be mapped to the equivalent bones and vertices on a separately created synthetic model. This effectively causes the synthetic model to execute the actor's performance, albeit with lower fidelity to the original. Because the synthetic model to which the live performance is to be retargeted often comprises relatively fewer vertices and bones, only a handful of markers are necessary.

While adequate for most motion-picture and entertainment needs, certain applications require high fidelity representations of an actor's performance. One such application is the depiction of microexpressions, minute involuntary physical changes on an individual's face, typically as a consequence of a suppressed emotion. Microexpressions typically last a few tenths of a second, such as less than half a second. For example, a microexpression can be less than 0.25 seconds, less than 0.2 second, or less than 0.1 seconds.

The psychologist Paul Ekman helped categorize these involuntary responses with the creation of a procedure to analyze human facial expressions, known as the facial action coding system (FACS). FACS linked most of the known emotions to specific muscle movements in the face, known as Action Units, which work together to achieve a particular expression. FACS identifies 72 such units and explains how they are triggered and what combinations result in specific emotions. FACS conveniently serves as an "alphabet" of emotional expression components and has been used both by psychologists and computer scientists to structure an otherwise amorphous set of emotions.

Because they indicate a suppressed emotion, microexpressions may be used to detect the statement of falsehoods, or ulterior motives. Some individuals are trained to recognize such microexpressions as part of interrogation or interview processes. Typically, these individuals must undergo extensive training with a live trainer who is already familiar with the techniques.

SUMMARY OF THE INVENTION

In one aspect of the present application, a system is provided for training a trainee to recognize facial expressions from animations of computer-simulated faces. The system comprises a trainee interface configured to display a facial animation, and a machine-readable repository of facial expression overlays each corresponding to an emotion. The system also includes an expression injection module configured to combine one of the expression overlays into a facial animation to form a combined animation, by mapping at least a portion of the expression overlay to at least a portion of the facial animation. The expression injection module may be configured to provide the combined animation for display in the trainee interface. A trainee evaluation module is also provided, which is configured to receive from the trainee a response to the combined animation displayed in the trainee interface. A computer system is operative to execute at least one of the trainee interface, the expression injection module, and the trainee evaluation module. The computer system is also operative to access the repository.

In another aspect of the present application, a method is provided for training a trainee to recognize facial expressions from animations of computer-simulated faces. The method comprises accessing at least a portion of a facial expression overlay from a machine-readable repository of facial expression overlays each corresponding to an emotion. The accessed expression overlay is combined into a facial animation to form a combined animation by mapping at least a portion of the accessed expression overlay to at least a portion of the facial animation. The combined animation is provided for display in a trainee interface. A trainee's response to the combined animation shown in the trainee interface is received. The received response is then used to determine a performance level indicative of an extent to which the trainee has correctly interpreted the combined animation. At least a portion of the method is performed by one or more computing devices.

Another aspect of the present application provides a computer-readable storage medium having computer-executable modules, for training a trainee to recognize facial expressions from computer-displayed facial animations. The storage medium comprises an expression injection module and a trainee evaluation module. The expression injection module is operative to access at least a portion of a facial expression overlay from a machine-readable repository of facial expression overlays each corresponding to an emotion, and to combine the accessed expression overlay into a facial animation to form a combined animation, by mapping at least a portion of the accessed expression overlay to a digital mesh of the facial animation. The expression injection module is also operative to provide the combined animation for display in a trainee interface configured to display facial animations of an avatar. The trainee evaluation module is operative to receive a trainee's response to the combined animation displayed in the trainee interface.

In another aspect, the present application provides a system for combining at least a portion of a microexpression into a facial animation. The system comprises a machine-readable repository of facial microexpression overlays each corresponding to a facial microexpression. An expression injection module is configured to combine at least a portion of one of the microexpression overlays into a facial animation. A computer system is operative to execute the expression injection module and access the repository.

In yet another aspect, the present application provides a method for combining at least a portion of a microexpression into a facial animation. The method comprises combining a facial microexpression overlay into a facial animation to form a combined animation, by mapping at least a portion of the microexpression overlay to at least a portion of a digital mesh of the facial animation. The method also comprises providing the combined animation for display. The method is performed by one or more computing devices.

In still another aspect, the present application provides a method for receiving a facial animation with a combined microexpression. The method comprises sending an emotion identifier to an expression injection module and receiving a combined animation from the expression injection module. The combined animation comprises the combination of at least a portion of a facial microexpression overlay corresponding to the emotion identifier with at least a portion of a facial animation, in which the microexpression overlay is mapped to a digital mesh of the facial animation. The method is performed by one or more computing devices.

In still another aspect, the present application provides a computer-readable storage medium storing a computer-readable program code adapted to be executed by hardware to perform a method comprising: accessing a facial microexpression overlay from a machine-readable repository of facial microexpression overlays each corresponding to a facial microexpression; combining the accessed microexpression overlay into a facial animation to form a combined animation, by mapping at least a portion of the accessed microexpression overlay to at least a portion of the facial animation; and providing the combined animation for display in an interface.

The present application also provides a computer-readable storage medium having computer-executable modules, executed by hardware, for combining a facial microexpression into a facial animation. The storage medium comprises a user interface and an expression injection module. The user interface is operative to present a set of emotions and receive a selection of one of the emotions by a user. The expression injection module is operative to select a facial microexpression overlay corresponding to the user-selected emotion from a machine-readable repository of facial microexpression overlays each corresponding to an emotion. The expression injection module is also operative to combine the selected microexpression overlay into a facial animation to form a combined animation, by mapping at least a portion of the microexpression overlay to at least a portion of a digital mesh of the facial animation. The expression injection module is further operative to provide the combined animation for display substantially immediately after the user interface receives the user-selected emotion.

The present application further provides, in another aspect, a method of inserting microexpression information into a facial animation, comprising: converting an actor's performance of a facial microexpression into a digital animation, subtracting a digital image of a substantially non-expressive facial pose of the actor from the animation to create an overlay of the microexpression, and mapping the overlay to a digital mesh of a facial animation sequence. The method is performed by one or more computing devices.

In yet another aspect, the present application provides a method comprising displaying an avatar in a virtual environment accessible to a plurality of users, the avatar corresponding to a first user. An instruction from the first user is received for controlling a facial animation of the avatar in the virtual environment. An emotion associated with the instruction is determined, and a facial microexpression overlay corresponding to the determined emotion is accessed. The microexpression overlay is combined into the facial animation of the avatar to form a combined animation, by mapping the microexpression overlay to the facial animation. At least a portion of the method is performed by one or more computing devices.

For purposes of summarizing the invention and the advantages achieved over the prior art, certain objects and advantages of the invention have been described above and as further described below. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

The features, objects, and advantages of the disclosed embodiments will become more apparent from the detailed description set forth below when taken in conjunction with the drawings, in which like reference characters identify correspondingly throughout and wherein.

While, for the purpose of simplicity of explanation, the methodologies shown in the various Figures are shown and described as a series of acts, it is to be understood and appreciated that the present invention is not limited by the order of acts, as some acts may, in accordance with the present invention, occur in different orders and/or concurrently with other acts from that shown and described herein.

DETAILED DESCRIPTION OF THE PREFERRED EMBODIMENTS

The present embodiments contemplate techniques to integrate not only high-fidelity expressions into facial animations, but microexpression performances as well. In some embodiments, these altered animations are subsequently used to facilitate training a trainee to recognize particular expressions or microexpressions in a variety of contexts.

In a preferred embodiment, raw facial microexpressions performed by an actor are captured using high-fidelity motion capture, such as markerless high-resolution surface capture (i.e., Mova® CONTOUR) and used to create animation overlays which may then be adapted to fit a variety of different facial meshes. Traditional techniques, such as cyberscanning or marker tracking may be used as well.

While FACS is a specific system for emotion classification, which may be used by performing actors in embodiments of the present invention, the present invention is not limited to the FACS system. In other words, preferred embodiments are FACS agnostic, having the capability of extracting and using microexpressions that were, or were not, identified using the FACS. Stated in another way, certain embodiments are "FACS-compatible", but not "FACS-based."

Certain embodiments provide a system to apply genuine and universal human emotional microexpressions onto realistic computer avatars. The system preferably permits both skilled trainers and casual users to author a series of synthetic conversations and to apply micro-expressions with imbued significance upon the faces of the speakers. These digital micro-expression motions can be authored into spoken sentences to seamlessly combine with existing conversational facial animation. The resulting face motion, including subtle real human emotional markers, can be played back as complete conversations composed with these sentence building blocks. Certain embodiments employ a universal facial structure that allows any such expressions and spoken language animations to operate upon thousands of unique human faces with consistent accuracy and fidelity, while running upon a personal computer in real time.

In certain embodiments, the present invention includes a software package that permits researchers and trainers in deception detection to create a variety of in-person interview scenarios using realistic computer generated human subjects via easy-to-use computer interfaces. For example, embodiments of the program can use this expert-created content to create a series of training materials that are to be monitored by a learning management system, with the ultimate goal of facilitating the rapid training of personnel in immigration, customs enforcement, and other security systems.

Figure 1:
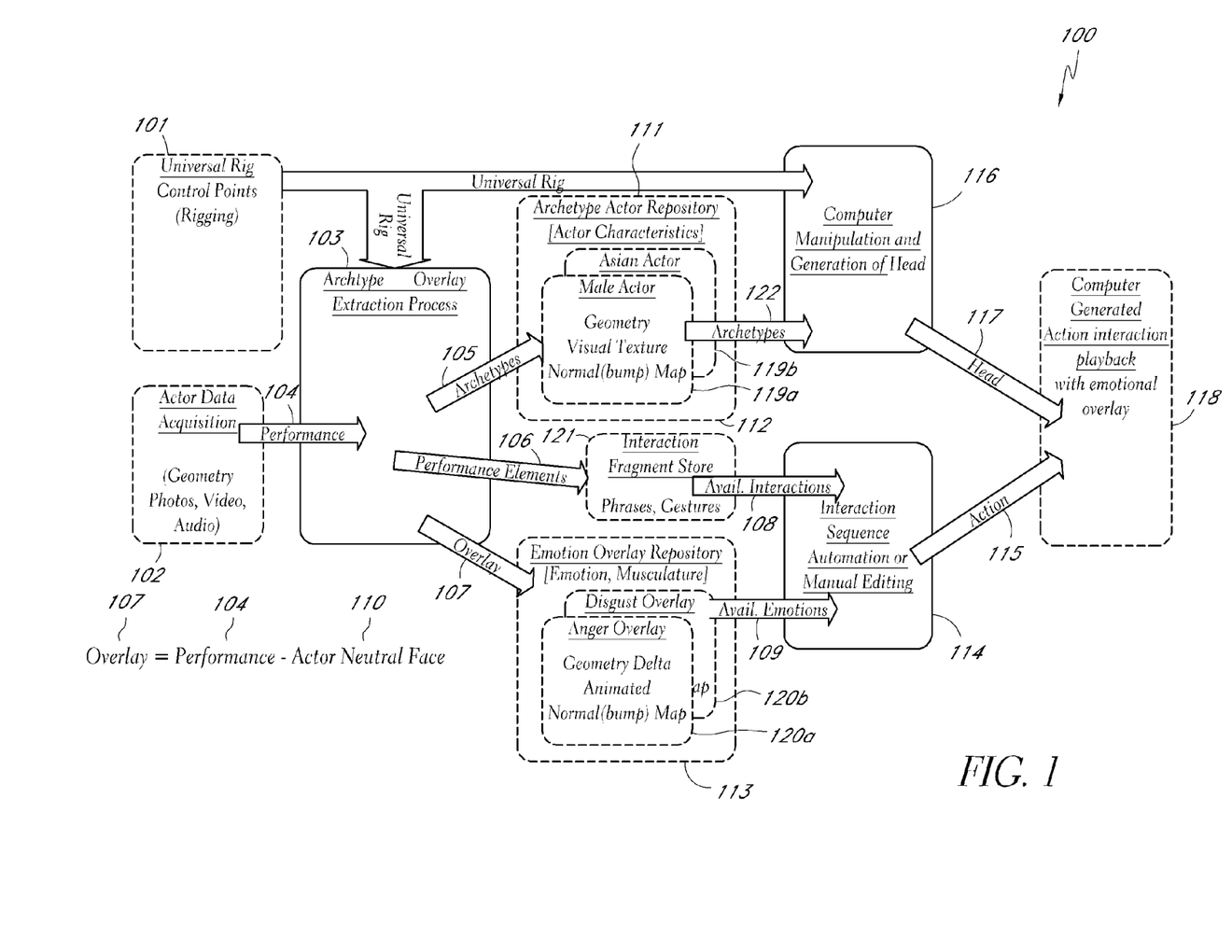
FIG. 1 is functional block diagram of an embodiment of a system for creating a repository of microexpression overlays and generating animations depicting microexpressions and other features.

FIG. 1 is a functional block diagram of a system and methodology 100 according to an embodiment for acquiring microexpression overlays from an actor's live performance 104 and subsequently using the overlays to generate a new animation 118. The methodology preferably involves taking three dimensional captures of live actor performances using, e.g., a markerless high-resolution surface capture technique such as Mova® CONTOUR. Any of different various surface capture techniques will suffice, including both markerless and marker-based, so long as they are of adequate resolution. These motion captures preferably comprise "very-high-resolution" (VHR) geometries of each of the actor's performances 104. In some embodiments, vertex densities of these geometries are on the order of 10,000-20,000 polygons. In addition to the high density geometric models, photographs and audio recordings may be taken and stored in conjunction with each performance. Each of the actor's performances 104 generally fall within one of two categories: microexpression performances and non-microexpression performances.

Non-Microexpression Performances

The non-microexpression performances comprise gestural and verbal responses 106 and archetype information 105. The archetype information 105 comprises at least one neutral face 110. This neutral face 110 is simply the capture of the actor's expressionless face, which is stored as part of an archetype actor repository 111. This neutral pose provides information regarding the actor's personal features 119a, 119b such as the relative positioning of the eyes and mouth. This information is referred to herein as archetypes 122.

The gestural and interactive performances 106 can be stored in their own repository 121, also referred to herein as an "interaction fragment store". These performances are not required for microexpression overlay generation, but are useful for the creation of training materials.

In some embodiments, the performances are retargeted to a generalized mesh having a lower resolution to facilitate deployment on personal computers and to generalize the performance so that it might more easily be applied to other models. A generic face model, referred to herein as a "universal rig" or "rig" 101 is used to reduce the high-density performance data 104 to a lower density form which is more manageable for real-time rendering on a personal computer. The rig 101 thus comprises a "neutral" or "average" base facial mesh, of a lower density than the geometries captured from live actors. In some embodiments, the rig resolution comprises a model having roughly 1600 vertices. In many embodiments, the rig density is chosen to satisfy rendering requirements on personal computer systems (typically the raw performance geometries are too large for such real-time rendering).

By retargeting the high-density performance 104 to the lower density rig 101, a more general representation requiring less storage space can be placed in each of the repositories 111, 121, and 113 (discussed below), which are preferably machine readable computer storages. Rig retargeting may be generally performed for all the performances, both microexpression and non-microexpression. Thus, the stored archetypes 122, gestures and interactions 108, and overlays 107 retrieved 109 from the repositories are typically of lower, rig-based resolution than the original performances 104 from which they are derived.

In addition to the stored meshes, audio and photographs of the actors may be stored in each repository 111, 121, 113. In some embodiments, an artist may use photographs taken of the actor to generate textures compatible with the archetypical geometric mesh (for example, using tools such as Zbrush®). In some embodiments, the photos themselves may be used from a performance 104 to identify dermal displacements to depict in a bump map. From these textures, animated bump maps may be generated and used to increase the apparent resolution of the model without increasing the polygon count. A bump map is a file associated with a texture map, wherein each bump map pixel describes a perturbation of the surface normal of the object to which the texture map is to be applied. By modifying the lighting of the texture based on the perturbation in the bump map, the illusion of a higher vertex resolution may be given to the object. This is especially useful where retargeting of performances to the rig 101 may have reduced vertex resolution, omitting minute features of the actor's face such as details of the microexpression in the form of dermal wrinkles, etc.

Microexpression Performances

Microexpression performances typically comprise the actor's controlled execution of a microexpression beginning from a neutral, i.e. expressionless, face 110. The controlled execution of a microexpression typically requires that the actor be specially trained in the expression technique. In some embodiments a single frame is stored 113 from the performance when the microexpression is maximally expressed (a "static" performance). In other embodiments a succession of frames are stored 113 to capture the microexpression as it is expressed over time (a "dynamic" performance). While controlled executions of microexpression performances are typical, some embodiments involve capturing uncontrolled or inadvertent microexpression performances.

The archetype and overlay extraction process 103 generates microexpression overlays 107 by subtracting the actor's neutral face 110 from the performance 104 of the microexpression. In this context, "subtracting" may mean identifying the offset necessary to translate each pixel from its position in the neutral mesh to its position in the performance mesh. The facial animation and each of the resulting microexpression overlays may comprise vertex displacements over time, in which case the displacement in each frame is used to generate each frame of the overlay. The resulting overlay 107 will consist of a collection of vertex offsets in one or more frames, which are stored in repository 113 in association with each of the microexpression types 120a, 120b which were performed. In some embodiments, the overlay offsets may also comprise bone information. Overlay 107 creation may be performed either before or after the VHR geometries have been reduced to the rig 101 resolution via retargeting. Typically, however, the subtraction is performed after mapping to the rig 101 so as to generalize the overlays and to optimize storage space.

Computer manipulation and generation 116 of the head 117 may be performed using the universal rig 101 and the archetypes 122. In some embodiments, however, the head 117 is taken from a collection 116 that is not derived from the archetypes 122 and rig 101 (such as a cartoon rendering, facial mesh from a different dataset, etc.). In some embodiments, the selected or generated head 117 will serve as the foundation upon which gestures, microexpressions, etc. 115 are to be depicted. A module for interaction sequence automation or manual editing 114 retrieves interactions 108 from the interaction fragment store 121 or microexpression overlays 107 by accessing 109 the expression overlay repository 113. These are combined with the head 117 to generate animation 118. This combination is accomplished via the operations of an expression injection module described below. One skilled in the art will recognize that a "module" may be computer hardware, computer software, or a combination of both.

Figure 2:
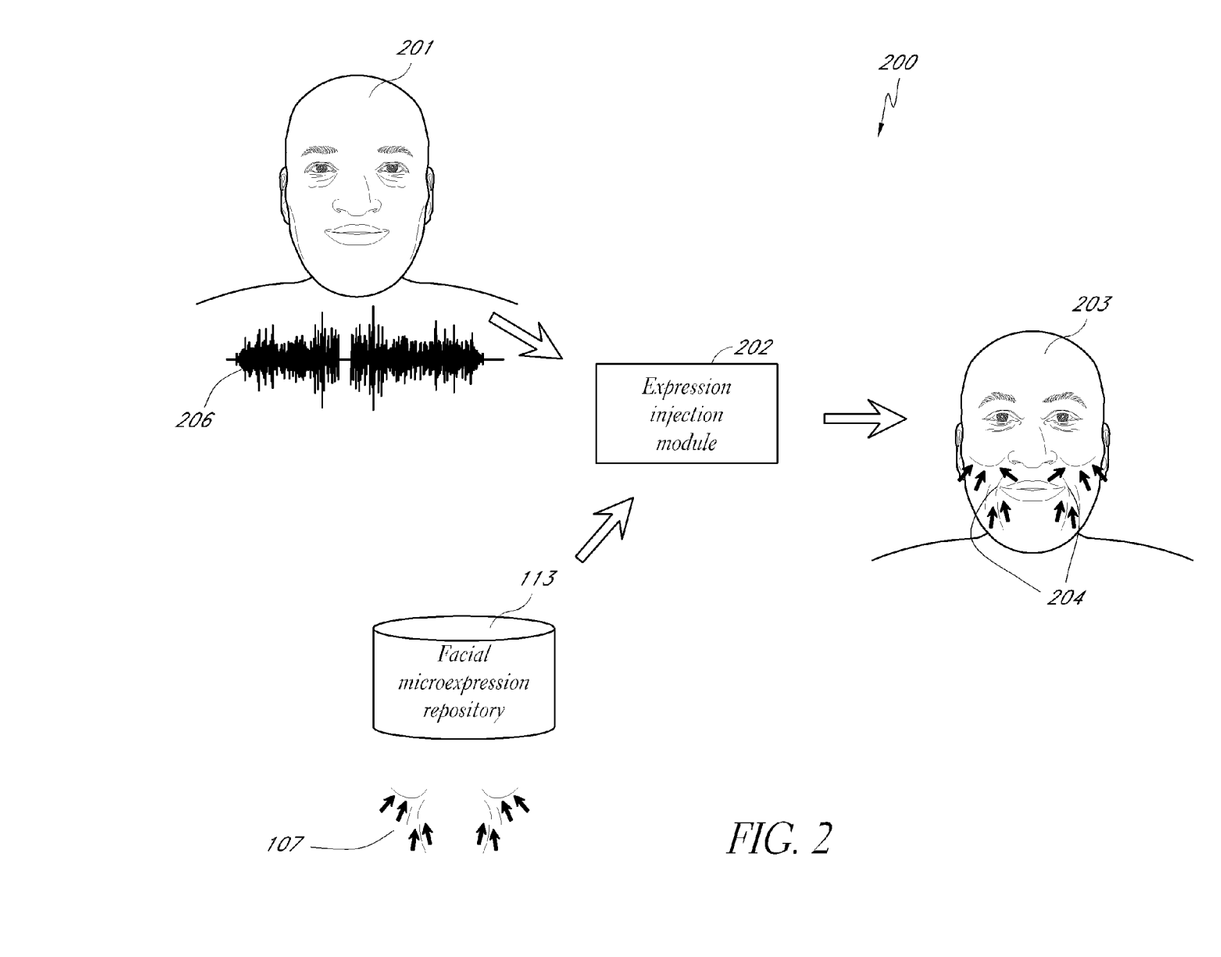
FIG. 2 is a functional block diagram of an embodiment of a system for inserting microexpression overlays into synthetic or actor-based computer generated heads.

FIG. 2 is a functional block diagram of a system 200 for inserting microexpression overlays 107 (FIG. 1) and actions 108 into synthetic or actor-based computer generated heads 117. The system inserts a microexpression performance from the repository 113 into a computer-represented facial geometry 201. In some embodiments, the geometry 201 is synthetically generated (an animated character), or may be taken from a repository of facial meshes (i.e., repository 111). The mesh may be animated, in some embodiments with a live actor performance (i.e. from repository 121). Facial geometry 201 may comprise a static frame or a succession of frames to create an animation. A succession of frames may constitute a representation of a speech performance. In this case, an accompanying audio excerpt 206 may be included. Certain of the performances 104 (e.g., the non-microexpression performances) captured from the live actors and stored in repository 121, for example, may comprise spoken portions.

A repository of facial microexpression overlays 113, as created by the methods described in FIG. 1, is provided. Expression injection module 202 preferably combines the geometry 201 with the overlay 107 from repository 113. Various methods may be used to facilitate the combination. In one embodiment, the offsets of the overlays 107 are added to the vertex positions in each frame of animation 201. The percentage of the overlay offset may vary over time, or at the direction of a user as discussed below. If a single static frame of a microexpression performance was used to create the overlay 107, then vertices in the geometry 201 may be modified to positions interpolated between their original point and the points of the overlay by a variety of interpolation techniques (linear, polynomial, spline, etc.). The resulting geometry 203 comprises microexpressions 204 in addition to the original geometry 201. More than one overlay 107 may be simultaneously combined with the geometry 201 by averaging or taking percentages of each overlay offset value. In some embodiments, overlays may be added to the face in realtime, substantially immediately upon selection by a user.

Figure 3:
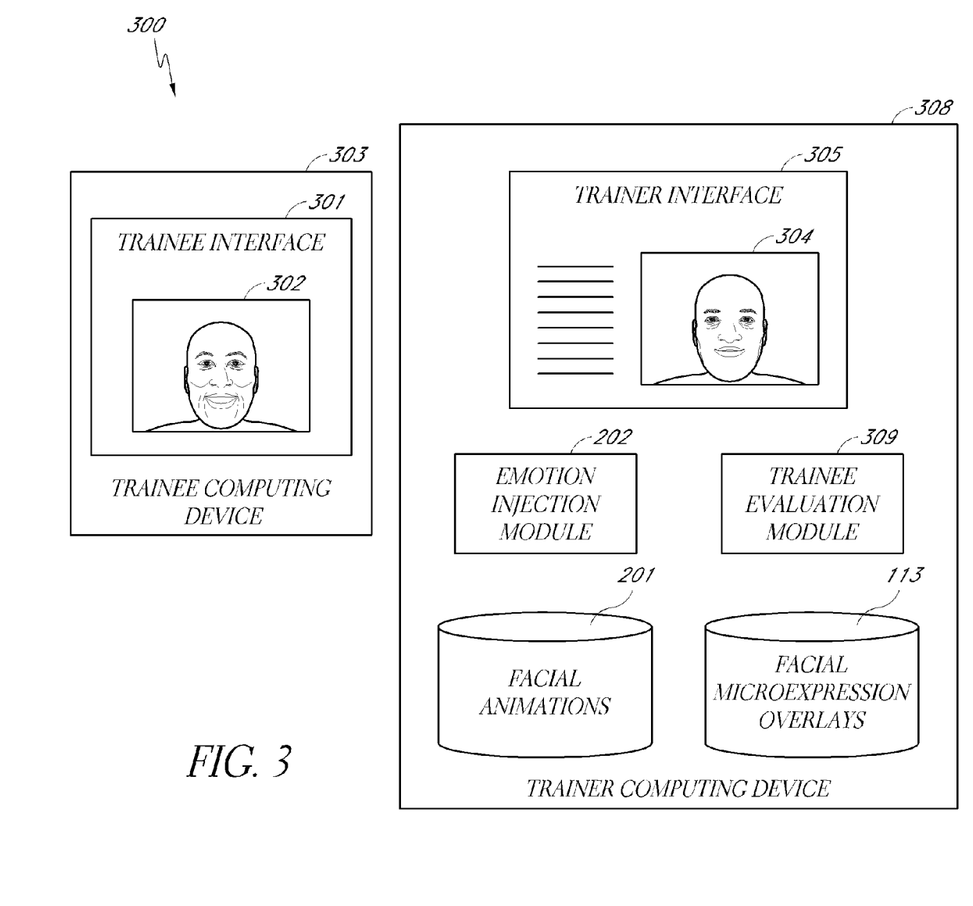
FIG. 3 is a high-level diagram of an embodiment of a training system to teach and evaluate trainees to recognize microexpressions.

FIG. 3 is a high-level diagram of an embodiment of a training system 300 to teach trainees how to recognize microexpressions, and to evaluate the trainees' performance. The system includes a trainee computing device 303 presenting a trainee interface 301 with various training materials 302. The system also includes a trainer computing device 308, which comprises various facial animations 201, a repository of facial microexpression overlays 113, expression injection module 202, trainee evaluation module 309 and trainer interface 305 comprising tools for generating training material 304 for the trainee.

Figure 4:
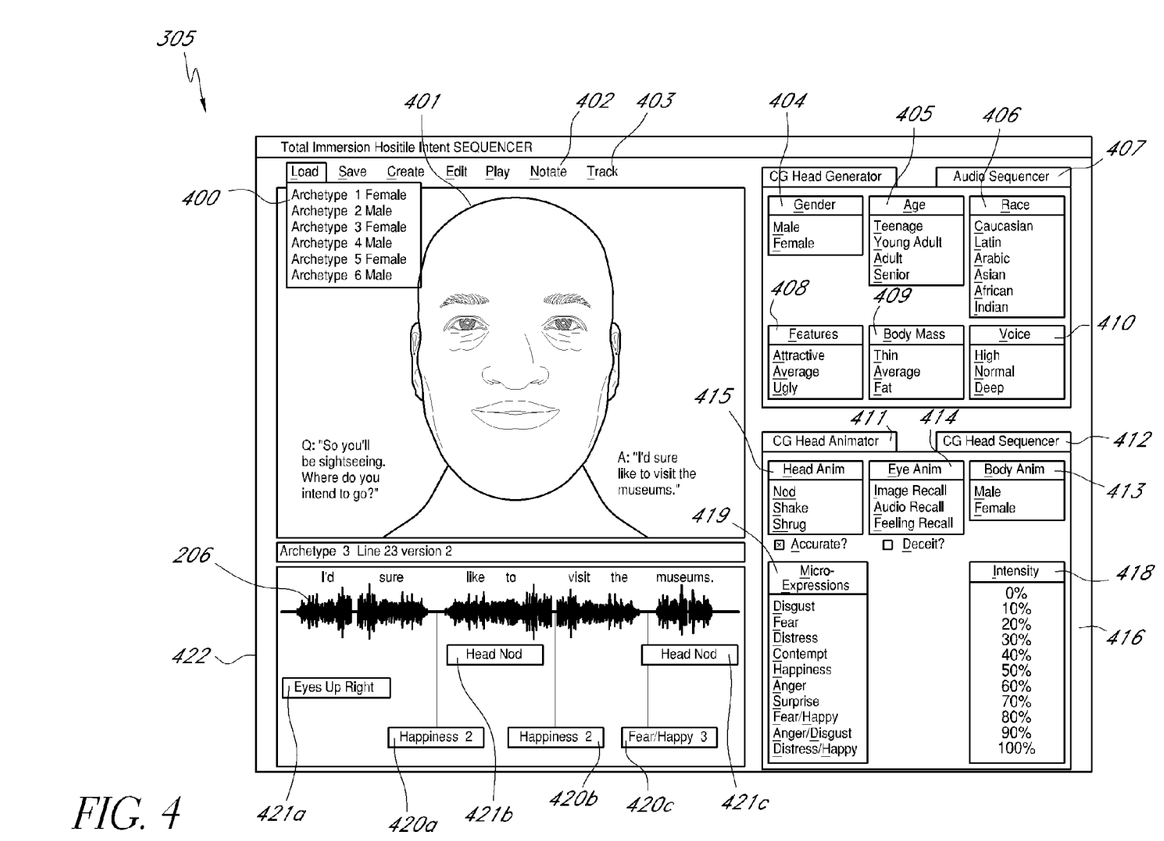
FIG. 4 illustrates an embodiment of a user interface to develop animations by combining expression or microexpression overlays in conjunction with interview trees and voice sequences.

In certain embodiments, a trainee views the display interface 301 to recognize facial microexpressions from animations of computer-simulated faces 302. The animations may be created automatically, in which case the trainer interface 305 may not be necessary. In some embodiments, a trainer interface may be used to initially create all the training materials, but the human trainer need not be involved in the actual training process itself. Thus, it may be possible that the trainee computing device 303 and trainer computing device 308 are a single machine or two separate machines. When training materials are created, the expression injection module 202 is preferably configured to combine one or more of the facial microexpression overlays 107 (FIG. 1) from repository 113 into a facial animation 201 to form a combined animation 203 (FIG. 2), by mapping at least a portion of the expression overlay 107 to at least a portion of the facial animation 201. In some embodiments, the trainer selects the overlays 107 from repository 113 to apply to a particular animation 201. After the user is presented with the facial animation 203 (FIG. 2) with microexpressions, the trainee evaluation module 309 may be used to assess the trainee's skill. In some embodiments, trainees provide responses to the training materials via trainee interface 301. Trainees may attempt to interpret or discern emotional state conveyed by the facial animations based on microexpressions, or to recognize simply that a microexpression has been performed. Trainers may simulate real-world microexpression behavior by limiting the microexpression duration to approximately $\frac{1}{25}$-$\frac{1}{5}$ of a second. In various implementations, a microexpression can be less than 0.25 seconds, less than 0.2 second, or less than 0.1 seconds. It will be appreciated that the ability to insert ever shorter microexpressions is useful because those may be the most difficult microexpressions to detect, and the ability to train users to detect them is therefore advantageous. In some embodiments, the trainee evaluation module 309 is configured to use the received response to determine a performance level indicative of an extent to which the trainee has correctly interpreted the one or more combined animations. In some embodiments, the evaluation module 309 will report the performance level by displaying it in the trainee or another interface. While shown here as residing on the trainer computing device 308, one skilled in the art will readily recognize that the trainee evaluation module 309 may reside on the trainee computing device 303 or a third device not shown. Trainee evaluation may or may not occur in real time. Advantageously, this system does not require that the trainer be familiar with the FACS coding system or with the recognition of microexpressions to create and administer a training program FIG. 4 is a display of an embodiment of one possible computer-implemented trainer interface 305. The illustrated trainer interface 305 displays a preliminary rendering 401 of the animation being created. The trainer may select from a variety of models 400, having different neutral (e.g., substantially expressionless) geometries as a result of the gender and different individual characteristics of the actor or synthetic character. Once a model is selected, the gender 404, age 405, ethnicity 406, various facial features 408, body mass 409, and/or voice 410 may be modified. Other embodiments may include additional similar features.

In addition to head generation, a CG head animator 411 is provided with a variety of pre-programmed animations that can be selectively combined to generate new animations. A head sequencer 412 may permit joining of multiple animations sequentially. Head animations 415, eye animations 414, and body animations 413 are all provided to enable more realistic portrayals of the various emotions. In addition to these general parameters are the microexpression specific variables, such as the selected microexpression 419 (in some embodiments referred to as an emotion identifier) and its intensity 418. In some embodiments, animations having higher microexpression intensity are expressed for a longer time and/or with greater amplitude.

The interface may also comprise a visual rendering of a voice sequence associated with an animation. An audio sequencer 407 may be used to select and modify the speech segments 206. Each speech segment 206 comprises spoken text, but may be additionally provided with facial cues, 421a, 421b, 421c, etc., which the trainer may manipulate or supplement. At intervals between speech segments, the interface permits microexpression overlay insertions 420a, 420b, 420c, etc. In the illustrated embodiment, a microexpression insertion 420 can have a trainer-selected intensity 418 (e.g., "happiness 2", where "2" represents intensity). In certain embodiments, the expression injection module 202 is configured to limit an intensity of at least a portion of the inserted microexpression in the combined animation based on the speech data. The overlays may be referenced by terms or symbols indicating their location on the face. In some embodiments, the emotions commonly associated with the expression ("happy", "sad", etc.) may refer to a given expression. As shown in 420c, which has both "fear" and "happy", simultaneous insertion of multiples microexpressions is possible. In these instances, the overlays may be summed and averaged before being inserted.

Advantageously, it has been found that certain difficulties inherent to microexpression insertion (e.g., discontinuities in the facial animation, cancellation of microexpression effects by the facial animation, etc.) can be overcome by inserting microexpression overlays between speech segments. The longer the time between speech segments, the more refined the overlay interpolation may be. Though overlays are shown here as inserted between speech segments to avoid interference with the speech animation, in other embodiments they may be inserted at any point throughout the animation.

Microexpression overlays can preferably be applied dynamically at runtime to a particular facial animation, to create a modified animation containing the microexpression. Alternatively, the overlays may be applied and stored for subsequent replay. They may preferably also be stored as "training loops" (e.g., single sentences of facially animated spoken dialogue that can be replayed) or as "interview trees", (e.g. conversations between an animated, interviewed character and the trainee. An animated interview tree can be rendered from the point of view of the interviewer, so that the trainee views the animation as though the trainee is the interviewer. In certain embodiments, a microexpression overlay can be applied even to a facial animation of a face that is different from that of the actor from whom the overlay was derived. For example, if the bone layout (and/or other applicable retargeting constraints of the Rig 111) of the new facial model is substantially the same as that of the model created for the original actor, then the overlay can be applied to the model to generate the same microexpression. Thus, the trainer interface 305 can permit expert weighting of all content (e.g., inserted emotions or microexpressions) and control of difficulty settings for detection of highly subtle facial clues when the animations play in real time or are shown as static frames.

Figure 5:
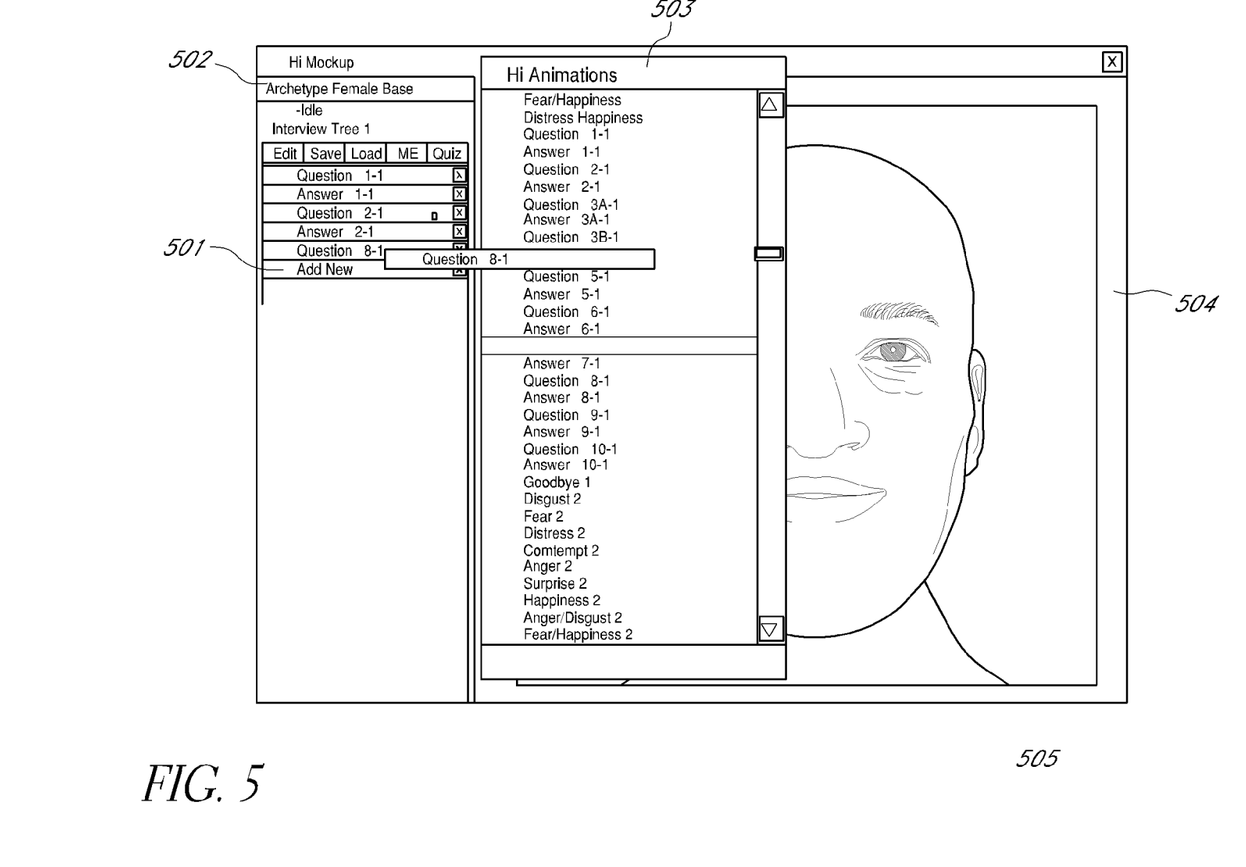
FIG. 5 illustrates an embodiment of a user interface to develop animations by combining expression or microexpression overlays in conjunction with interview trees and voice sequences.

FIG. 5 is another display of an embodiment of the trainer user interface 305, which specifies the sequence of animations that will comprise the training material. Here the trainer interface specifies the interview tree structure provided to the trainee. In this example an interview 501 comprises a succession of questions and answers with accompanying animations for those responses provided by a synthetic character 505. The trainer may insert additional animations via dropdown menu 503. Animations of selections may be previewed in a preview frame 504 to ensure that the desired end result has been achieved. Interview trees could be instead constructed by numerous other interfaces, which may or may not permit immediate visualization of the constructed response.

Figure 6:
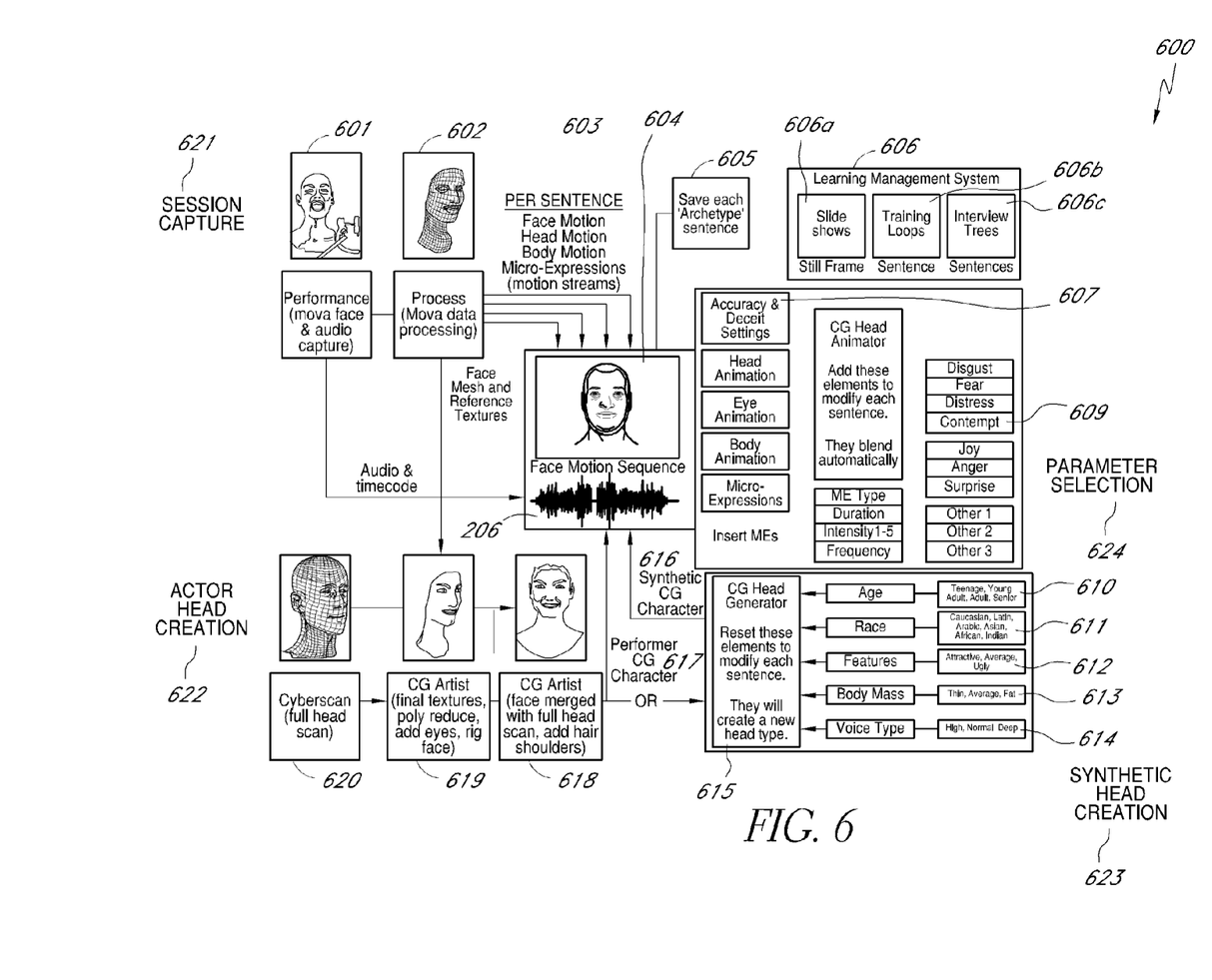
FIG. 6 is a system-block diagram of an embodiment of an integrated microexpression training system.

FIG. 6 is a system-block diagram of an embodiment of an integrated microexpression training system 600 employing methods and techniques such as those previously described. The first portion 621 of the system comprises the "session capture" of actor performances 104. In this portion the VHR geometries 602 are generated for each performance 104. For each captured sentence 603, the head, face, body, and microexpressions (if present) of the actor are captured. These captures are saved 605 and stored for subsequent use in the Learning Management System (LMS) 606. The LMS 606 provides these captures to the trainer interface 305 (FIG. 3) to create training sessions and training materials. The training materials may comprise slide shows 606a, training loops 606b, and/or interview trees 606c. The interview trees 606c may be created as described above with respect to FIG. 5.

Three-dimensional renderings of the actor heads can also be captured statically 620 as part of actor head creation 622. Photography accompanying the capture 619 may be used to texture the model to create a more lifelike appearance. Hair and shoulders may similarly be added 618 to suggest realism. The face mesh 620 may be used to facilitate this process by properly aligning one or more photographs to the model. Alternatively, the head may be synthetically created 623 by manipulating the user-selected elements 610 (age), 611 (race), 612 (features/attractiveness), 613 (body mass), and/or 614 (voice type) of synthetic and actor models to generate 615 a new synthetic model. Once the model has been generated, the desired microexpressions and gestures inserted, and the accompanying training materials prepared, the resulting facial motion sequences 604 and accompanying audio 206, if available, are presented to the trainee.

Once the head and overlay materials are assembled, the trainer can modify the animation to the desired specifications. Head animation 608a, eye animation 608b, body animation 608c, and microexpressions 107 can be specified in the LMS 606 using the various control features such as 413-417 of FIG. 4. As mentioned, in some embodiments, the emotions commonly associated with the expression or microexpression 609 ("disgust", "fear", etc.) may be used to refer to a particular overlay that may be selected 624. The trainer may employ these overlays while establishing the deceit settings 607 of the animation to be used in conjunction with the training materials (i.e. the degree and nature of the microexpressions displayed). The trainer may thus choose between raw actor performances 617 or modified, synthetic performances 616 when creating animations to supplement the training material.

Figure 7:
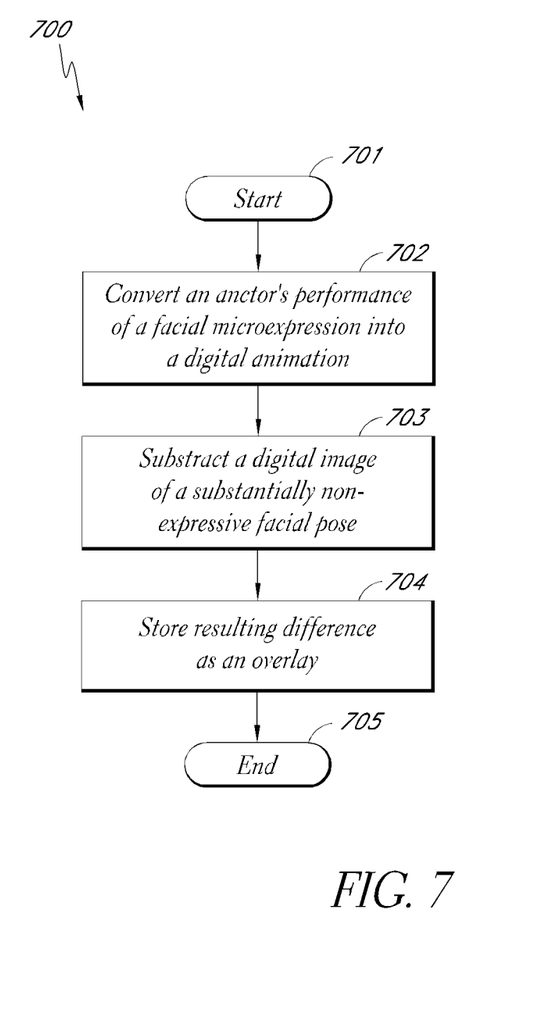
FIG. 7 is a flow diagram illustrating in greater detail certain of the steps involved in the microexpression overlay generation system of FIG. 1, in accordance with one embodiment.

FIG. 7 depicts one possible embodiment of a method for acquiring microexpression overlays. The method 700 begins 701 by converting a trained expert's performance 104 of a facial microexpression into a digital animation 702. In certain embodiments this is accomplished using Mova® CONTOUR technology, but any technology capable of highly granular motion capture would suffice. During a capture session, a digital image of a substantially non-expressive facial pose 110 is taken 703 as well. This "normalized" facial pose is then subtracted from subsequent microexpression captures—leaving only the microexpression overlay 107. The resulting difference is stored 704 as an overlay before coming to an end 705. The overlay may subsequently be calibrated (i.e.) retargeted to facial meshes other than the facial mesh of the expert who performed the microexpression as described above.

Figure 8:
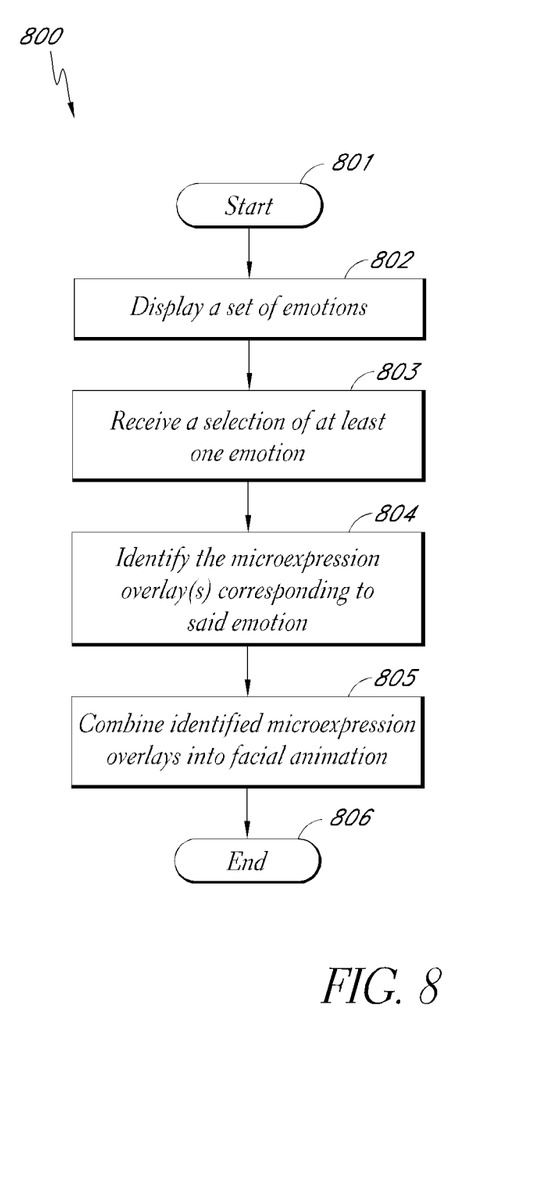
FIG. 8 is a flow diagram of an embodiment of a method associated with the overlay insertion system shown in FIG. 2.

With reference to FIG. 8, an embodiment of a method for selecting and presenting microexpressions 107 is disclosed, which begins 801 by displaying 802 a set of emotions or expressions to a user at a user interface, such as the interface 305 shown in FIG. 3. For purposes of simplicity, in some embodiments microexpression selection is accomplished by selecting a desired "emotion" response rather than the actual FACS expression units. The user (e.g., a trainer creating training materials) selects at least one emotion, although more than one, or percentages of different emotions, may be chosen in certain embodiments. The system receives 803 the user's selection. The microexpression overlay(s) corresponding to the user-selected emotion(s) is (are) identified 804 and then combined or blended 805 ("combine" and "blend" are used synonymously herein and in U.S. Provisional Application No. 61/119,975) with the facial animation to create the desired combined animation. In certain embodiments, each of the microexpression overlays in the repository 113 (FIG. 1) corresponds to one of the emotions displayed 802.

Figure 9:
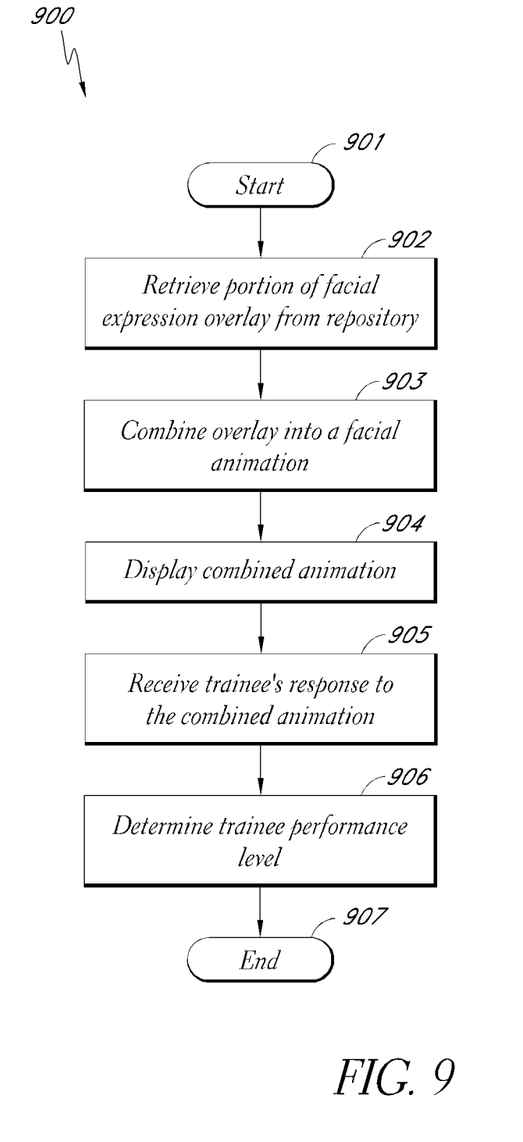
FIG. 9 is a flow diagram illustrating in greater detail certain of the steps involved in the training system of FIG. 3, in accordance with one embodiment.

With reference to FIG. 9, an embodiment of a method for training an individual using several of the above described embodiments is provided. The method begins 901 by retrieving 902 a portion of a facial expression overlay from the repository 113 (FIG. 1) to form a combined animation. This overlay is then combined 903 into a facial animation as described above. This combined animation is then presented 904 to the trainee at the trainee interface 301, possibly with the accompanying audio, so that the trainee may provide a response (e.g., an indication of one or more emotions or expressions believed by the trainee to be shown in the animation that was presented 904). In the illustrated embodiment, the received response may be used to determine a performance level indicative of an extent to which the trainee has correctly interpreted the combined animation. The trainee's performance level may then be determined 906, possibly by the trainee evaluation module 309 (FIG. 3).

Figure 10:
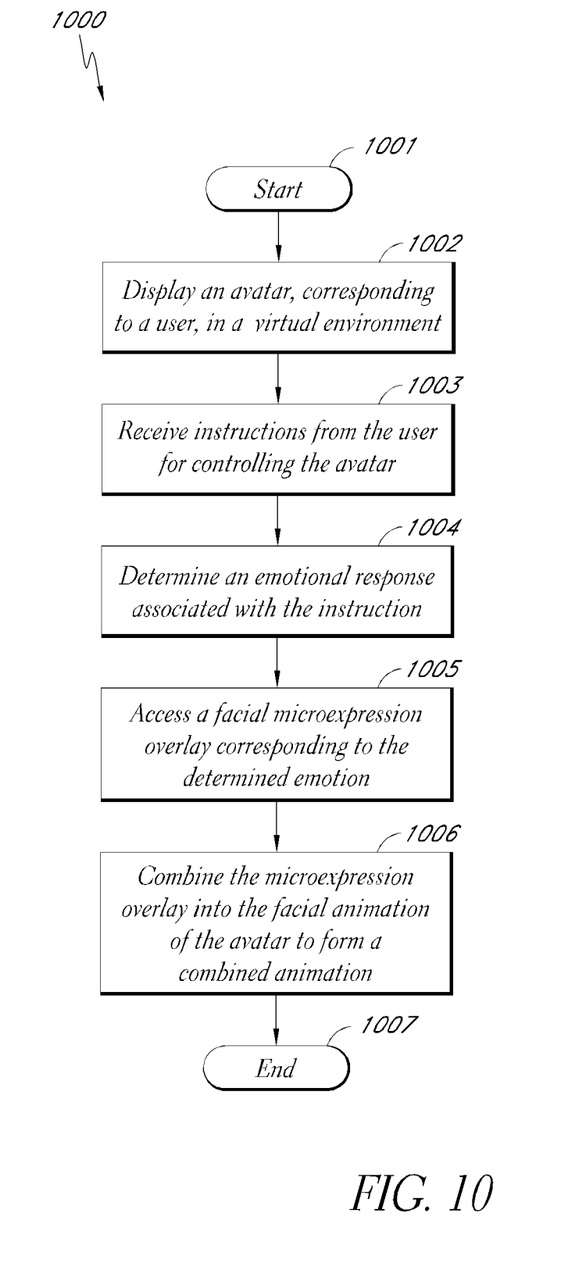
FIG. 10 is a flow diagram of an embodiment of a method for incorporating microexpression overlays into an avatar display in a virtual environment.

In addition to the training methodologies described above, the present embodiments can facilitate various additional applications. One possible application is the incorporation of microexpressions into social exchanges in virtual worlds (e.g., in a virtual environment run locally or on the internet) to facilitate involuntary tacit communication of emotion, e.g., falsehoods, uneasiness, etc. FIG. 10, for example, depicts one embodiment of a method for using microexpressions in a virtual environment. The method begins 1001 by displaying 1002 an avatar, corresponding to a user, in a virtual environment, although one skilled in the art would readily recognize that a non-playable character (NPC) may also be designed to exhibit microexpressions. Where the avatar corresponds to the user, the system then receives 1003 instructions from the user for controlling the avatar. The instructions may cause the avatar to perform some action or function, or to express certain behavior or content. In either event, the system can determine 1004 an emotional response associated with the instruction and access 1005 a facial microexpression overlay corresponding to the determined emotion. In certain embodiments, an autonomous system may perform these functions to create emergent behavior in an avatar, so as to supplement an artificial intelligence and to appear more lifelike. Such a system may concurrently observe user actions and determine which will generate a microexpression response. The system can be configured to use this information to drive face, body and head gestures.

Microexpression leakage may be known to trained observers, but not to most members of the online virtual community. Using the methods described above, the system can then combine 1006 the microexpression overlay into the facial animation of the avatar to form a combined animation. In this manner, conversation between users or users and NPCs can include not only explicit, standardized-expression statements, but more realistically, the involuntary aspects of communication that occur in the real world. Abstracting the microexpression leakage as non-verbal communication of emotion, that emotion can be combined or swapped with other non-verbal emotive techniques, such as recognition or injection of head nod, body language, eye motion and vocal tone. Speech recognition may further be incorporated to facilitate recognition of vocalized incongruities and to detect emotion-rich phrases and expletives. In the converse, masking such non-verbal communication can itself be a feature of the system. In some embodiments, the involuntary response may arise from emergent behavior (i.e. a combination of several factors). In some embodiments, comparing the statement to the user's profile will suffice to determine if microexpression leakage arises. In some embodiments, a degree to which a microexpression overlay is combined with a facial animation is determined by emergent behavior arising from the virtual environment and/or the user.

Finally, other embodiments of facial emotion creation, authoring and activation can involve creation of conversation systems for learning the nuances of social interaction, dating, job screening interviews, post traumatic stress detection and even the detection of underlying emotions behind poker faces and deceitful public figures. Many other applications for learning underlying emotions associated with facial expressions in a variety of settings are possible.

Prototype systems have already demonstrated the effectiveness of the above-described microexpression overlay creation, insertion, and training methods. Tests were devised to capture and test data and validate it on a series of software platforms (from art tools to final software engines), and an expert trainer was utilized both as an actual capture subject and to coach other performers. Comprehensive R&D prototyping was achieved using lower resolution tests and scaling up to the available resources while quick reference movies of results were instantly shared to resolve issues of image quality.

Numerous technical details have been set forth in this document in order to fully disclose, and to facilitate an understanding of, particular embodiments of the system. As will be recognized, the various inventive features set forth in this document may be implemented differently than described herein. Thus, nothing in this document or the appendices is to be construed as a requirement of, or as a limitation on the scope of, any of the disclosed inventions.

The techniques described in this disclosure may be implemented in hardware, software, firmware, or combinations thereof. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

Various embodiments of this disclosure have been described. These and other embodiments are within the scope of the following claims.

We claim:

1. A system for training a user to recognize facial expressions from animations of computer-simulated faces, the system comprising:
    a storage system configured to store a plurality of facial expression overlays, each facial expression overlay corresponding to an emotion;
    a computer system configured to:
        receive user input indicating an interview question,
        select a facial expression overlay from the plurality of facial expression overlays as a response to the interview question, and
        combine the selected facial expression overlay into a facial animation to form a combined animation by mapping at least a portion of the selected facial expression overlay to at least a portion of the facial animation; and
    a graphical user interface configured to display the combined animation.

2. The system of claim 1, wherein the received user input is a selection of the interview question from a plurality of predefined interview questions.

3. The system of claim 1, wherein the plurality of facial expression overlays comprise facial microexpression overlays, each facial microexpression overlay being less than 0.5 seconds in duration.

4. The system of claim 1, wherein the computer system is further configured to receive a second user input indicating a user-identified emotion for the displayed combined animation.

5. The system of claim 4, wherein the computer system is further configured to compare the user-identified emotion to the emotion corresponding to the selected facial expression overlay.

6. The system of claim 5, wherein the computer system is further configured to display an indication of a result of the comparison in a user interface.

7. A method for combining a facial expression of a user into a facial animation, the method comprising:
    selecting an interview question;
    communicating the interview question to the user;
    capturing the facial expression of the user;
    determining an emotion associated with the captured facial expression;
    combining a facial expression overlay that corresponds to the emotion into the facial animation to form a combined animation by mapping at least a portion of the facial expression overlay to at least a portion of the facial animation; and
    displaying the combined animation.

8. The method of claim 7, further comprising:
    identifying the facial expression overlay that corresponds to the emotion from a plurality of facial expression overlays.

9. The method of claim 7, further comprising:
    converting the captured facial expression of the user into a digital animation; and generating the facial expression overlay that corresponds to the emotion based on the converted digital animation.

10. The method of claim 9, wherein the facial expression overlay is generated by subtracting a digital image of a non-expressive facial pose of the user from the converted digital animation.

11. The method of claim 7, wherein the interview question is communicated to the user by generating an audible speech.

12. The method of claim 7, further comprising:
displaying an animated texture bump map on the combined animation.

13. The method of claim 12, wherein the animated texture bump map displays a portion of a facial expression represented by the facial expression overlay.

14. The method of claim 12, wherein the animated texture bump map is extracted from the captured facial expression of the user.

15. A non-transitory computer-readable medium, having instructions stored therein, which when executed cause a computer to perform a set of operations comprising:
receiving user input indicating an interview question;
selecting a facial microexpression overlay from a plurality of facial microexpression overlays as a response to the interview question, each of the plurality of facial microexpression overlays corresponding to an emotion;
combining the selected facial microexpression overlay into a facial animation to form a combined animation by mapping at least a portion of the selected facial microexpression overlay to at least a portion of the facial animation; and
displaying the combined animation.

16. The non-transitory computer-readable medium of claim 15, wherein the facial microexpression overlay is less than 0.25 seconds in duration.

17. The non-transitory computer-readable medium of claim 15, having further instructions stored therein, which when executed cause the computer to perform a set of operations comprising:
adding a vertex displacement of the selected facial microexpression overlay with a vertex displacement of the facial animation, wherein the facial animation and each of the plurality of facial microexpression overlays comprise vertex displacements over time.

18. The non-transitory computer-readable medium of claim 15, wherein the selected facial microexpression overlay is mapped to a digital mesh of the facial animation.

19. The non-transitory computer-readable medium of claim 18, wherein the digital mesh of the facial animation uses a spring-based, dermal elasticity model.

20. The non-transitory computer-readable medium of claim 15, having further instructions stored therein, which when executed cause the computer to perform a set of operations comprising:
selecting a second facial microexpression overlay from the plurality of facial microexpression overlays as a response to the interview question; and
combining the second facial microexpression overlay into the facial animation such that the selected facial microexpression overlay and the second facial microexpression overlay appear simultaneously in the combined animation.

* * * * *